US007650219B2

(12) United States Patent
Livshiz et al.

(10) Patent No.: US 7,650,219 B2
(45) Date of Patent: Jan. 19, 2010

(54) RESERVE TORQUE MANAGEMENT FOR ENGINE SPEED CONTROL

(75) Inventors: Michael Livshiz, Ann Arbor, MI (US); Scott J. Chynoweth, Davison, MI (US); Todd R. Shupe, Milford, MI (US); Jeffrey M. Kaiser, Highland, MI (US); Christopher E. Whitney, Highland, MI (US); Ning Jin, Novi, MI (US)

(73) Assignee: GM Global Technology Operations, Inc.

( * ) Notice: Subject to any disclaimer, the term of this patent is extended or adjusted under 35 U.S.C. 154(b) by 192 days.

(21) Appl. No.: 11/972,090

(22) Filed: Jan. 10, 2008

(65) Prior Publication Data

US 2009/0118965 A1 May 7, 2009

Related U.S. Application Data

(60) Provisional application No. 60/984,878, filed on Nov. 2, 2007.

(51) Int. Cl.
*G06F 19/00* (2006.01)

(52) U.S. Cl. ...................................................... 701/101

(58) Field of Classification Search ................. 701/101, 701/102, 51, 54, 41, 114; 477/62, 63
See application file for complete search history.

(56) References Cited

U.S. PATENT DOCUMENTS

| | | | | |
|---|---|---|---|---|
| 5,040,648 | A * | 8/1991 | Mitchell et al. | 477/62 |
| 6,219,607 | B1 * | 4/2001 | Piepenbrink et al. | 701/51 |
| 6,278,925 | B1 * | 8/2001 | Wozniak | 701/54 |
| 6,816,765 | B2 * | 11/2004 | Yamamoto et al. | 701/41 |
| 7,021,282 | B1 | 4/2006 | Livshiz et al. | |

* cited by examiner

*Primary Examiner*—Hieu T Vo
(74) *Attorney, Agent, or Firm*—Harness, Dickey & Pierce, P.L.C.

(57) ABSTRACT

An engine control module comprises a base reserve module, a power steering reserve module, a reserve torque module, first and second engine actuator modules, and an engine speed control module. The base reserve module determines a base reserve torque. The power steering reserve module determines a power steering reserve torque. The reserve torque module determines a first reserve torque based on the base reserve torque, the power steering reserve torque, and at least one of an oil temperature of an engine and a barometric pressure. The first and second engine actuator modules control first and second actuators of the engine, respectively. The engine speed control module instructs the first engine actuator module to produce a first torque output from the engine and instructs the second engine actuator module to produce a second torque output from the engine.

19 Claims, 5 Drawing Sheets

RESERVE TORQUE MANAGEMENT FOR ENGINE SPEED CONTROL

CROSS-REFERENCE TO RELATED APPLICATIONS

This application claims the benefit of U.S. Provisional Application No. 60/984,878, filed on Nov. 2, 2007. The disclosure of the above application is incorporated herein by reference.

FIELD

The present disclosure relates to internal combustion engine control and more particularly to reserve torque.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control module comprises a base reserve module, a power steering reserve module, a reserve torque module, first and second engine actuator modules, and an engine speed control module. The base reserve module determines a base reserve torque. The power steering reserve module determines a power steering reserve torque. The reserve torque module determines a first reserve torque based on the base reserve torque, the power steering reserve torque, and at least one of an oil temperature of an engine and a barometric pressure. The first and second engine actuator modules control first and second actuators of the engine, respectively. The engine speed control module instructs the first engine actuator module to produce a first torque output from the engine and instructs the second engine actuator module to produce a second torque output from the engine. The second torque output is approximately equal to a sum of the first reserve torque and the first torque output.

In other features, the engine speed control module, in order to produce the first torque output from the engine, instructs the first engine actuator module to produce the first torque output and the second engine actuator module to produce the second torque output. The first engine actuator module comprises a spark control module and the second engine actuator module comprises a throttle area control module.

In still other features, the base reserve module determines the base reserve torque based on air per cylinder (APC) of the engine and engine speed (RPM). The engine control module further comprises a stabilized RPM module and a stabilized APC module. The stabilized RPM module determines a stabilized RPM based on the RPM, a desired RPM, and a predetermined RPM value. The stabilized APC module that determines a stabilized APC based on the APC, a desired APC, and a predetermined APC value. The base reserve module determines the base reserve torque based on the stabilized RPM and the stabilized APC.

In further features, the power steering reserve module determines the power steering reserve torque based on power steering angle and rate of change of the power steering angle. The reserve torque module determines the first reserve torque based on the oil temperature and the barometric pressure.

In still further features, an increase in the oil temperature results in a decrease in the first reserve torque. In other features, an increase in the barometric pressure results in a decrease in the first reserve torque. The engine control module further comprises a reserve torque limits module. The reserve torque limits module applies at least one of an upper limit and a lower limit to the first reserve torque.

A method comprises: determining a base reserve torque; determining a power steering reserve torque; determining a first reserve torque based on the base reserve torque, the power steering reserve torque, and at least one of an oil temperature of an engine and a barometric pressure; adjusting a first engine actuator to produce a first torque output from the engine; and adjusting a second engine actuator to produce a second torque output from the engine. The second torque output is approximately equal to a sum of the first reserve torque and the first torque output.

In other features, the method further comprises producing the first torque output from the engine by adjusting the first engine actuator to produce the first torque output and by adjusting the second engine actuator to produce the second torque output. The method further comprises determining the base reserve torque based on air per cylinder (APC) of the engine and engine speed (RPM).

In further features, the method further comprises: determining a stabilized RPM based on the RPM, a desired RPM, and a predetermined RPM value; and determining a stabilized APC based on the APC, a desired APC, and a predetermined APC value. The base reserve torque is determined based on the stabilized RPM and the stabilized APC.

In still further features, the method further comprises determining the power steering reserve torque based on power steering angle and rate of change of the power steering angle. The method further comprises determining the first reserve torque based on the oil temperature and the barometric pressure.

In still further features, an increase in the oil temperature results in a decrease in the first reserve torque. In other features, an increase in the barometric pressure results in a decrease in the first reserve torque. The method further comprises applying at least one of an upper limit and a lower limit to the first reserve torque.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
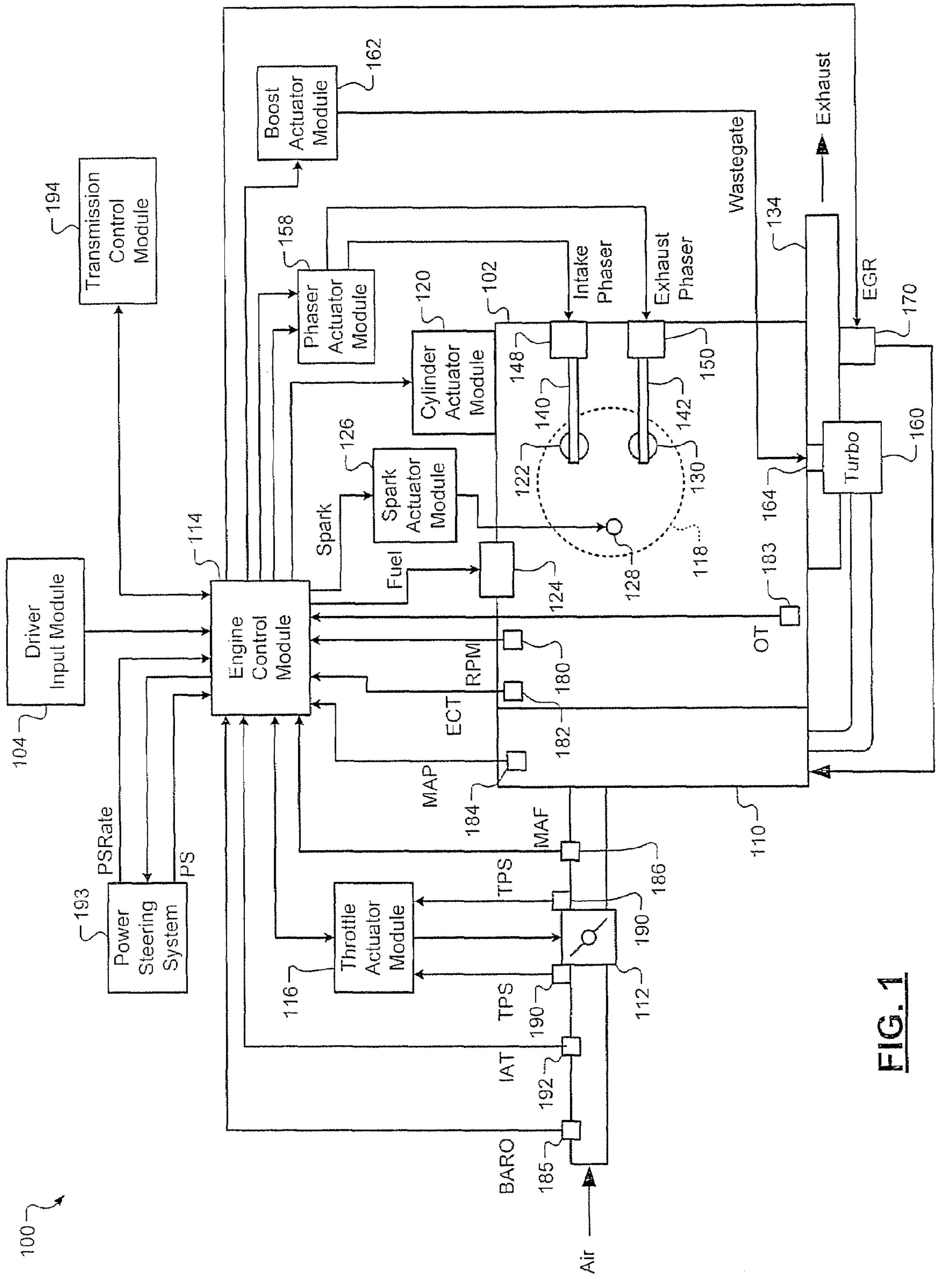
FIG. 1 is a functional block diagram of an exemplary engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, or 12 cylinders. The ECM 114 may instruct a cylinder actuator module 120 to selectively deactivate some of the cylinders to improve fuel economy.

Air from the intake manifold 110 is drawn into the representative cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164.

An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown). The temperature of oil within the engine 102 may be measured using an oil temperature (OT) sensor 183. The OT sensor 183 may be located at any location where the oil circulates, such an oil pan (not shown).

The pressure within the intake manifold 110 may be measured using a manifold absolute pressure (MAP) sensor 184. In various implementations, engine vacuum may be measured, where engine vacuum is the difference between ambient air pressure (i.e., barometric pressure) and the pressure within the intake manifold 110. For example only, the barometric pressure (BARO) may be measured by a barometric pressure sensor 185.

The mass of air flowing into the intake manifold 110 may be measured using a mass air flow (MAF) sensor 186. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192.

The engine system 100 may also include a power steering system 193 that aids the driver in steering the vehicle. For example, the power steering system 193 may assist the driver in turning wheels of the vehicle based upon a driver input, such as turning a steering wheel (not shown). The power steering system 193 measures the angle at which the power steering is turned (PS). The power steering angle may be the angle that the steering wheel is turned to. Alternatively, the power steering angle may be the angle of one or more of the wheels. The power steering angle may be measured from a predetermined angle, which may correspond to an angle where the vehicle is not turning. The power steering system 193 may also measure the rate at which the power steering angle is changing (PSRate). The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. In various implementations, the ECM 114 and the transmission control module 194 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position or actuator value.

Similarly, the spark actuator module 126 can be referred to as an actuator, while the corresponding actuator position may be the amount of spark advance. This spark advance may be measured from a predetermined piston position, such as TDC. Other actuators may include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

When an engine transitions from producing one torque to producing another torque, many actuator positions will change to produce the new torque most efficiently. For example, spark advance, throttle position, exhaust gas recirculation (EGR) regulation, and cam phaser angles may change. Changing one of these actuator positions often creates engine conditions that would benefit from changes to other actuator positions, which might then result in changes to the original actuators. This feedback results in updating actuator positions until they are all positioned to produce a desired torque most efficiently.

Large changes in torque often cause significant changes in actuator positions, which cyclically cause significant change in other actuator positions. This is especially true when using a boost device, such as a turbocharger or supercharger. For example, when the engine is commanded to significantly increase a torque output, the engine may request that the turbocharger increase boost.

In various implementations, when boost pressure is increased, detonation, or engine knock, is more likely. Therefore, as the turbocharger approaches this increased boost level, the spark advance may need to be decreased. Once the spark advance is decreased, the desired turbocharger boost may need to be increased to achieve the desired torque. This circular dependency causes the engine to reach the desired torque more slowly. This problem is exacerbated because of the already slow response of turbocharger boost, commonly referred to as turbo lag.

Figure 2:
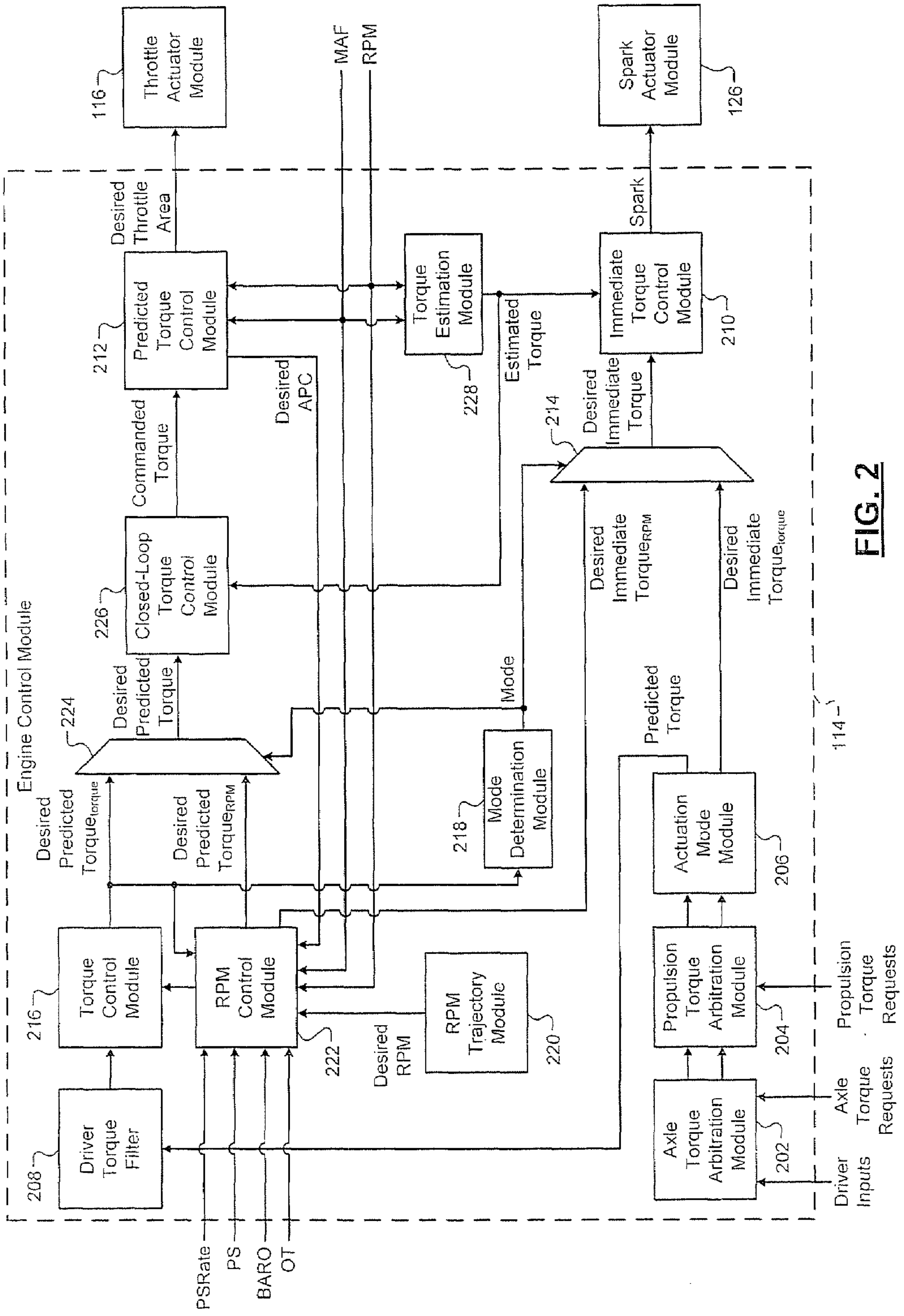
FIG. 2 is a functional block diagram of an exemplary implementation of an engine control module according to the principles of the present disclosure.

Referring now to FIG. 2, a functional block diagram of an exemplary implementation of the ECM 114 is presented. The ECM 114 includes an axle torque arbitration module 202. The axle torque arbitration module 202 arbitrates between driver inputs from the driver input module 104 and other axle torque requests. For example, driver inputs may include an accelerator pedal position. Other axle torque requests may include torque reduction requested during a gear shift by the transmission control module 194, torque reduction requested during wheel slip by a traction control system, and torque requests to control speed from a cruise control system.

The axle torque arbitration module 202 outputs a predicted torque and a torque control desired immediate torque (Desired Immediate $\text{Torque}_{torque}$). The predicted torque is the amount of torque that will be required in the future to meet the driver's torque and/or speed requests. The torque control desired immediate torque is the torque required at the present moment to meet temporary torque requests, such as torque reductions when shifting gears or when traction control senses wheel slippage.

The torque control desired immediate torque may be achieved by engine actuators that respond quickly, while slower responding engine actuators are targeted to achieve the predicted torque. For example, a spark actuator may be able to quickly change the spark advance, while cam phaser or throttle actuators may be slower to respond. The axle torque arbitration module 202 outputs the predicted torque and the torque control desired immediate torque to a propulsion torque arbitration module 204.

The propulsion torque arbitration module 204 arbitrates between the predicted torque, the torque control desired immediate torque, and propulsion torque requests. Propulsion torque requests may include torque reductions for engine over-speed protection and torque increases for stall prevention. For example only, the propulsion torque arbitration module 204 may adjust the predicted torque and the torque control desired immediate torque based upon the propulsion torque requests.

An actuation mode module 206 receives the predicted torque and torque control desired immediate torque from the propulsion torque arbitration module 204. Based upon a mode of operation, the actuation mode module 206 determines how the predicted torque and the torque control desired immediate torque will be achieved. For example, in a first mode of operation, the actuation mode module 206 may output the predicted torque to a driver torque filter 208.

In the first mode of operation, the actuation mode module 206 may instruct an immediate torque control module 210 to set the spark timing to a calibration value that achieves the maximum possible torque. The immediate torque control module 210 may control engine parameters that change relatively more quickly than engine parameters controlled by a predicted torque control module 212. For example, the immediate torque control module 210 may control spark advance, which may reach a commanded value by the time at which the next cylinder fires. In the first mode of operation, the torque control desired immediate torque is ignored by the predicted torque control module 212 and by the immediate torque control module 210.

In a second mode of operation, the actuation mode module 206 may output the predicted torque to the driver torque filter 208. However, the actuation mode module 206 may instruct the immediate torque control module 210 to attempt to achieve the torque control desired immediate torque, such as by retarding the spark.

In a third mode of operation, the actuation mode module 206 may instruct the cylinder actuator module 120 to deactivate cylinders if necessary to achieve the torque control desired immediate torque. In this mode of operation, the predicted torque is output to the driver torque filter 208 and the torque control desired immediate torque is output to a first selection module 214. For example only, the first selection module 214 may be a multiplexer, switch, or any other suitable device.

In a fourth mode of operation, the actuation mode module 206 outputs a reduced predicted torque to the driver torque filter 208. The predicted torque may be reduced only so far as is necessary to allow the immediate torque control module 210 to achieve the torque control desired immediate torque using spark retard.

The driver torque filter 208 receives the predicted torque from the actuation mode module 206. Additionally, the driver torque filter 208 may receive signals from the axle torque arbitration module 202 and/or the propulsion torque arbitration module 204, which may indicate whether the predicted torque is a result of driver input. If so, the driver torque filter 208 may filter out high frequency torque changes, such as those that may be caused by the driver's foot modulating the accelerator pedal while on rough road. The driver torque filter 208 outputs the predicted torque to a torque control module 216.

The torque control module 216 determines a torque control desired predicted torque (Desired Predicted $Torque_{torque}$), which corresponds to a desired torque output of the engine 102. For example only, the torque control module 216 may determine the torque control desired predicted torque based upon the predicted torque, the accelerator pedal position, and/or a control mode. Further discussion of the functionality of the torque control module 216 may be found in commonly assigned U.S. Pat. No. 7,021,282, issued on Apr. 4, 2006 and entitled "Coordinated Engine Torque Control," the disclosure of which is incorporated herein by reference in its entirety.

A mode determination module 218 determines the control mode based on the torque control desired predicted torque. For example only, when the torque control desired predicted torque is less than a calibrated torque value, the mode determination module 218 may determine that the control mode is an RPM control mode. Alternatively, the control mode may be a torque control mode, such as when the torque control desired predicted torque is greater than or equal to the calibrated torque. For example only, the control mode MODE, may be determined by the following equation:

$$MODE_1 = \begin{bmatrix} RPM, & \text{if(Desired Predicated } Torque_{torque} < CAL_T) \\ TORQUE, & \text{if(Desired Predicated } Torque_{torque} \geq CAL_T) \end{bmatrix}, \quad (1)$$

where Desired Predicted $Torque_{torque}$ is the torque control desired predicted torque and $CAL_T$ is the calibrated torque.

The ECM 114 also includes an RPM trajectory module 220 that determines a desired RPM based on, for example, accelerator pedal position and/or RPM. The RPM trajectory module 220 may determine the desired RPM based on a standard block of RPM control described in detail in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

An RPM control module 222 receives the desired RPM from the RPM trajectory module 220, the RPM from the RPM sensor 180, the control mode from the mode determination module 218, the MAF from the MAF sensor 186, and the torque control desired predicted torque. The RPM control module 222 compares the RPM with the desired RPM and determines an RPM correction factor ($RPM_{error}$) based upon the comparison. The RPM control module 222 determines a predicted torque correction factor based upon the RPM correction factor. Additionally, the RPM control module 222 determines a minimum torque. The minimum torque corresponds to torque required to maintain the desired RPM. The RPM control module 222 may determine the minimum torque based upon, for example, a look-up table.

Engine loads may cause noticeable decreases in RPM. Accordingly, the RPM control module 222 may adjust engine actuators to reserve torque, which may be used to compensate for such loads. For example only, this reserve torque may be created by slightly increase engine airflow (e.g., MAF or APC) while adjusting fast responding engine actuators (e.g., spark timing) to produce the desired torque.

The amount of torque reserved by this adjustment may be referred to as a reserve torque. The RPM control module 222 determines the reserve torque based upon the RPM and the APC. The RPM control module 222 may also filter or buffer the RPM and/or the APC to enhance system stability.

An example of a system that may load the engine is the power steering system 193. The RPM control module 222 determines a power steering reserve based upon the power steering angle (PS) and rate of change of the power steering angle (PSRate). The RPM control module 222 adjusts the reserve torque based upon the power steering reserve.

Additionally, the RPM control module 222 may adjust the reserve torque based upon other conditions that may affect the engine system 100. The other conditions may include, for example, the oil temperature (OT) of the engine 102 and/or the barometric pressure (BARO). The RPM control module 222 adjusts the reserve torque based upon the oil temperature and/or the barometric pressure. For example only, the RPM control module 222 may increase the reserve torque at lower oil temperatures. Additionally, the RPM control module 222 may increase the reserve torque at lower barometric pressures. Barometric pressure may change, for example, with altitude.

The RPM control module 222 may also determine a feed-forward torque. The feed-forward torque may correspond to torque that may be required to compensate for, for example, activation of an air conditioner. The RPM control module 222 determines an RPM control desired predicted torque (Desired Predicted $Torque_{RPM}$) based upon the predicted torque correction factor, the minimum torque, and the reserve torque. The RPM control module 222 may also determine the RPM control desired predicted torque based upon the feed-forward torque.

A second selection module 224 receives the torque control desired predicted torque (Desired Predicted $Torque_{torque}$) and the RPM control desired predicted torque (Desired Predicted $Torque_{RPM}$). For example only, the second selection module 224 may be a multiplexer, switch, or any other suitable device. The second selection module 224 selects one of the torque control desired predicted torque and the RPM control desired predicted torque based upon the control mode. For example, the second selection module 224 may select the RPM control desired predicted torque when the control mode is the RPM control mode.

The mode determination module 218 therefore instructs the second selection module 224 to output the desired predicted torque from the torque control module 216 or the RPM control module 222. The second selection module 224 outputs the desired predicted torque to a closed-loop torque control module 226.

The closed-loop torque control module 226 receives the desired predicted torque from the second selection module 224 and an estimated torque from a torque estimation module 228. The estimated torque may be defined as the amount of torque that could immediately be produced by setting the spark advance to a calibrated value. This calibrated value may be set to the minimum spark advance that achieves the greatest torque for a given RPM and APC.

In various implementations, the torque estimation module 228 may use the MAF signal from the MAF sensor 186 and the RPM signal from the RPM sensor 180 to determine the estimated torque. Additionally, the torque estimation module 228 may use current intake and exhaust cam phaser angles to determine the estimated torque. These intake and exhaust cam phaser angles may be measured values. Further discussion of torque estimation can be found in commonly assigned U.S. Pat. No. 6,704,638, issued on Mar. 9, 2004 and entitled "Torque Estimator for Engine RPM and Torque Control," the disclosure of which is incorporated herein by reference in its entirety.

The closed-loop torque control module 226 compares the desired predicted torque to the estimated torque and determines a torque correction factor based upon the comparison. The closed-loop torque control module 226 determines a commanded torque based upon the torque correction factor and the desired predicted torque.

In various implementations, the torque correction factor may be the difference between the desired predicted torque and the estimated torque. Alternatively, the closed-loop torque control module 226 may use a Pi control scheme to meet the desired predicted torque. The torque correction factor may include a torque proportional. The torque proportional may be a proportional offset based on the difference between the desired predicted torque and the estimated torque. The torque correction factor may also include a torque integral. The torque integral may be an offset based on an integral of the difference between the desired predicted torque and the estimated torque. The torque correction factor ($T_{PI}$) may be determined using the equation:

$$T_{PI}=K_P*(T_{des}-T_{est})+K_I*\int(T_{des}-T_{est})\partial t, \quad (2)$$

where $K_P$ is a pre-determined proportional constant, $K_I$ is a pre-determined integral constant, $T_{des}$ is the desired predicted torque, and $T_{est}$ is the estimated torque.

The predicted torque control module 212 receives the commanded torque, the MAF signal, and the RPM signal. The predicted torque control module 212 determines desired engine parameters based upon the commanded torque. In various implementations, the desired engine parameters may include desired throttle area, desired MAF, desired manifold absolute pressure (MAP), and/or desired air per cylinder (APC). For example only, the predicted torque control module 212 may determine the desired throttle area, which is output to the throttle actuator module 116. The throttle actuator module 116 then regulates the throttle valve 112 to produce the desired throttle area.

Referring again to the RPM control module 222, the RPM control module 222 also determines an immediate torque correction factor based upon the RPM correction factor ($RPM_{error}$). Additionally, the RPM control module 222 determines a run torque. The run torque may correspond to torque that the engine 102 is currently producing. The RPM control module 222 may determine the run torque based on the following relationship:

$$T_{run}=f(\text{APC, RPM}, S, I, E), \quad (3)$$

where S is the spark advance, I is the intake cam phaser position, and E is the exhaust cam phaser position.

The RPM control module 222 determines an RPM control desired immediate torque (Desired Immediate $\text{Torque}_{RPM}$) based upon the run torque, the reserve torque, and the immediate torque correction factor. The RPM control module 222 outputs the RPM control desired immediate torque to the first selection module 214. Further discussion of the functionality of the RPM control module 222 may be found in commonly assigned U.S. Pat. App. No. 60/861,492, filed Nov. 11, 2006, entitled "Torque Based Speed Control," the disclosure of which is incorporated herein by reference in its entirety.

The first selection module 214 receives the torque control desired immediate torque from the actuation mode module 206 and the RPM control desired immediate torque from the RPM control module 222. The first selection module 214 selects one of the RPM control desired immediate torque and the torque control desired immediate torque based upon the control mode. For example only, the first selection module 214 may select the RPM control desired immediate torque when the control mode is the RPM control mode.

The mode determination module 218 therefore instructs the first selection module 214 to output the desired immediate torque from either the actuation mode module 206 or the RPM control module 222. The first selection module 214 outputs the desired immediate torque to the immediate torque control module 210.

The immediate torque control module 210 receives the desired immediate torque from the first selection module 214 and the estimated torque from the torque estimation module 228. The immediate torque control module 210 may set the spark advance using the spark actuator module 126 to achieve the desired immediate torque. The immediate torque control module 210 can therefore select the spark advance that reduces the estimated torque to the desired immediate torque.

Figure 3:
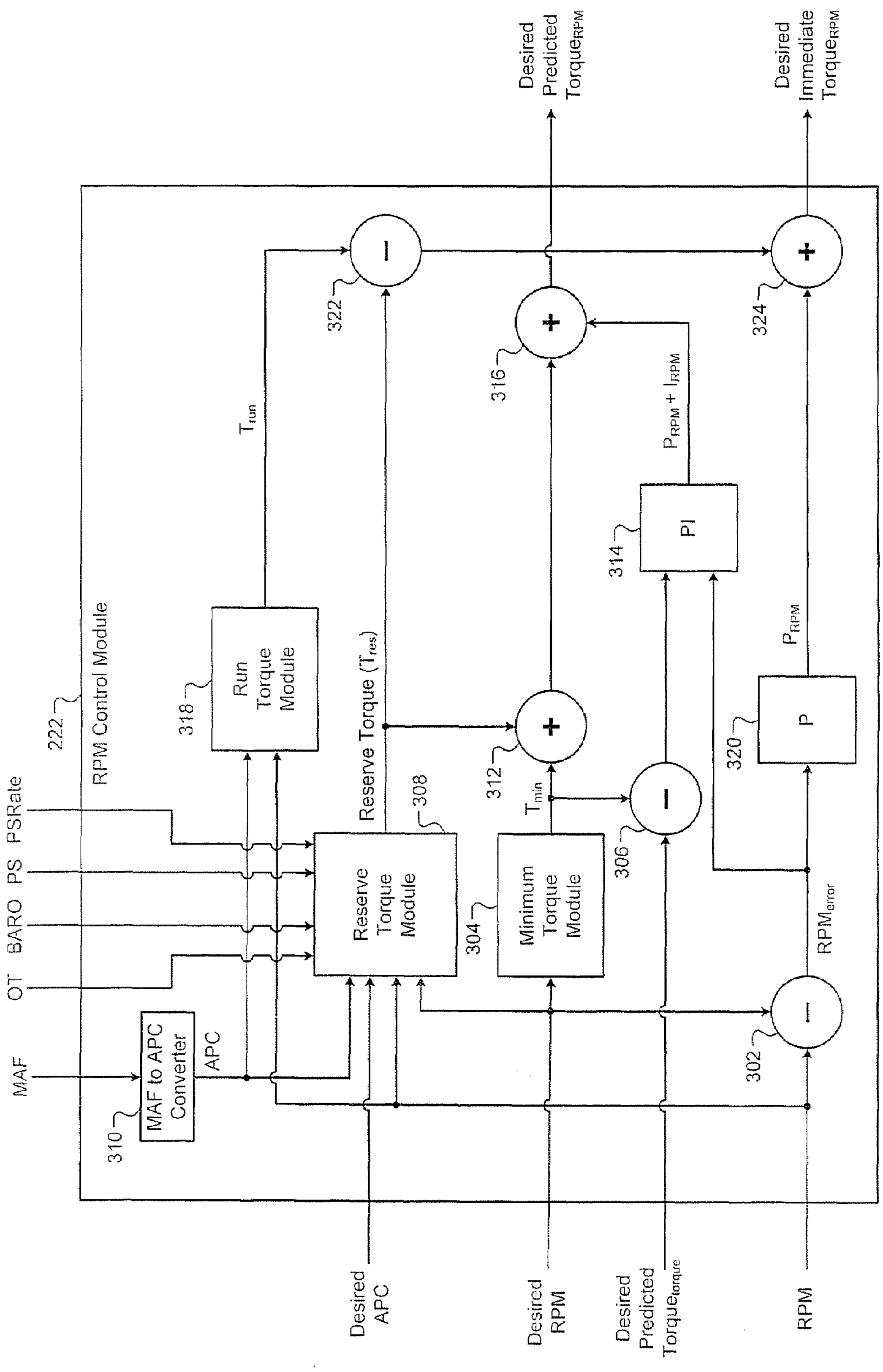
FIG. 3 is a functional block diagram of an exemplary implementation of an engine speed (RPM) control module according to the principles of the present disclosure.

Referring now to FIG. 3, a functional block diagram of an exemplary implementation of the RPM control module 222 is presented. The RPM control module 222 includes a first subtraction module 302 that determines the RPM correction factor ($RPM_{error}$) based upon the RPM signal from the RPM sensor 180 and the desired RPM from the RPM trajectory module 220. For example only, the RPM correction factor may be determined by subtracting the RPM from the desired RPM.

A minimum torque module 304 determines the minimum torque ($T_{min}$) based on the desired RPM. The minimum torque may correspond to torque necessary to maintain the RPM at the desired RPM. A second subtraction module 306 receives the torque control desired predicted torque (Desired Predicted $\text{Torque}_{torque}$) from the torque control module 216 and the minimum torque. For example only, the second subtraction module 306 may subtract minimum torque from the torque control desired predicted torque.

A reserve torque module 308 determines the reserve torque. For example only, the reserve torque may be determined based upon the desired RPM, RPM, APC, and the desired APC. The APC may be provided by a MAF to APC converter 310 that determines the APC based on the MAF. The reserve torque module 308 also determines the reserve torque based on a power steering reserve.

The power steering reserve may be determined based upon the power steering angle (PS) and the rate of change of the power steering angle (PSRate). For example only, the power steering reserve may increase as the power steering angle increases and/or the rate of change of the power steering angle increases. The reserve torque module 308 adjusts the reserve torque based upon the power steering reserve.

Additionally, the reserve torque module 308 may adjust the reserve torque based upon other conditions, such as oil temperature and/or barometric pressure. For example only, the reserve torque module 308 may increase the reserve torque at lower oil temperatures. Also, the reserve torque module 308 may increase the reserve torque at lower barometric pressures. Barometric pressure may change, for example, with altitude.

A first summation module 312 sums the reserve torque and the minimum torque. A PI module 314 receives the RPM correction factor from the first subtraction module 302 and the difference between the torque control desired torque and the minimum torque from the second subtraction module 306.

The PI module 314 determines the predicted torque correction factor based upon the RPM correction factor and the difference between the torque control desired predicted torque and the minimum torque. The predicted torque correction factor may include an RPM proportional ($P_{RPM}$) and/or an RPM integral ($I_{RPM}$). The RPM integral ($I_{RPM}$) may be an offset based on an integral of the difference between the desired RPM and the RPM signal. The RPM proportional ($P_{RPM}$) may be an offset based on a proportional difference between the desired RPM and the RPM signal. For example only, the RPM proportional $P_{RPM}$ may be determined using the equation:

$$P_{RPM}=K_P*(RPM_{des}-RPM), \tag{4}$$

where $K_P$ is a pre-determined proportional constant. For example only, the RPM integral $I_{RPM}$ may be determined using the equation:

$$I_{RPM}=K_I*\int(RPM_{des}-RPM)\partial t, \tag{5}$$

where $K_I$ is a pre-determined integral constant. Additionally, the PI module 314 may determine the predicted torque correction factor based upon the mode of operation. For example only, the RPM integral may be selected based upon the mode of operation.

Further discussion of PI control can be found in commonly assigned U.S. patent application Ser. No. 11/656,929, filed Jan. 23, 2007, and entitled "Engine Torque Control at High Pressure Ratio," the disclosure of which is incorporated herein by reference in its entirety. Additional discussion regarding PI control of engine speed can be found in commonly assigned U.S. patent application No. 60/861,492, filed Nov. 28, 2006, and entitled "Torque Based Engine Speed Control," the disclosure of which is incorporated herein by reference in its entirety.

A second summation module 316 determines the RPM control desired predicted torque (Desired Predicted Torque$_{RPM}$) based upon the predicted torque correction factor and the sum of the reserve torque and the minimum torque. For example only, the RPM control desired predicted torque may be the sum of the predicted torque correction factor, the reserve torque, and the minimum torque. The second summation module 316 outputs the RPM control desired predicted torque to the second selection module 224. In this manner, when the control mode is the RPM control mode the engine airflow is adjusted to allow the engine to provide the desired predicted torque as well as to create the reserve torque.

The RPM control module 222 also includes a run torque module 318 that determines the run torque ($T_{run}$). The run torque may correspond to torque that the engine is currently producing. The run torque module 318 may determine the run torque based upon, for example, the APC and/or the RPM. For example only, the run torque module 318 may determine the run torque based on the relationship described in equation (3) above.

The RPM control module 222 also includes a P module 320 that determines the immediate torque correction factor ($P_{RPM}$) based upon the RPM correction factor. For example only, the immediate torque correction factor may be determined using equation (4) above. A third subtraction module 322 receives the run torque and the reserve torque. For example only, the third subtraction module 322 may subtract the reserve torque from the run torque.

A third summation module 324 receives the immediate torque correction factor from the P module 320 and the difference between the run torque and the reserve torque. The third summation module 324 determines the RPM control desired immediate torque (Desired Immediate Torque$_{RPM}$) based upon the immediate torque correction factor and the difference between the run torque and the reserve torque. For example only, the RPM control desired immediate torque may be the sum of the immediate torque correction factor and the difference between the run torque and the reserve torque. The third summation module 324 outputs the RPM control desired immediate torque to the first selection module 214. In this manner, the RPM control desired immediate torque is adjusted, like the predicted torque, based upon the reserve torque. The immediate torque control module 210 may then adjust the spark timing (e.g., advance), thereby producing the desired torque and the reserve torque. This reserve torque may then be utilized by adjusting the spark timing (e.g., retard) as needed.

Figure 4:
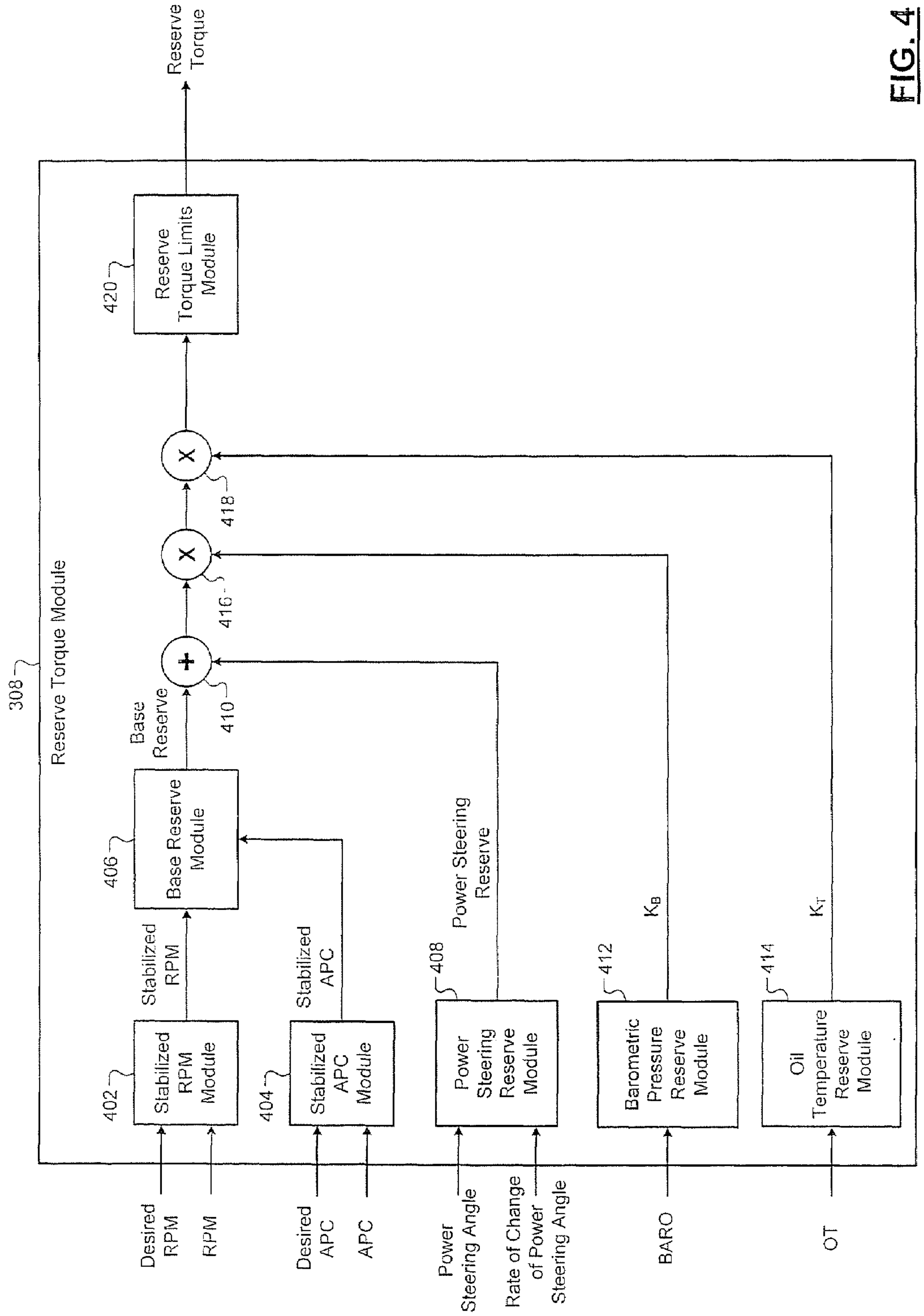
FIG. 4 is a functional block diagram of an exemplary implementation of a reserve torque module according to the principles of the present disclosure.

Referring now to FIG. 4, a functional block diagram of an exemplary implementation of the reserve torque module 308 is presented. The reserve torque module 308 includes a stabilized RPM module 402, a stabilized APC module 404, and a base reserve module 406. The stabilized RPM module 402 determines a stabilized RPM based upon the RPM and the desired RPM. The stabilized RPM module 402 may filter the RPM and/or the desired RPM to add system stability. For example only, the stabilized RPM may be described by the equation:

$$\text{Stabilized RPM}=k_R*\text{RPM}+(1-k_R)*\text{Desired RPM}, \tag{7}$$

where $k_R$ is an RPM filter coefficient. In various implementations, $k_R$ may be calibratable and may be determined from a lookup table based upon, for example, RPM, engine load conditions, and/or the mode of operation.

The stabilized APC module 404 determines a stabilized APC based upon the APC and the desired APC. The APC may be provided by, for example, the MAF to APC converter 310. The stabilized APC module 404 may filter the APC and the desired APC to add system stability. For example only, the stabilized APC may be described by the equation:

$$\text{Stabilized APC}=k_A*\text{APC}+(1-k_A)*\text{Desired APC}, \tag{8}$$

where $k_A$ is an APC filter coefficient. In various implementations, $k_A$ may be calibratable and may be determined from a lookup table based upon, for example, APC, engine load conditions, and/or the mode of operation.

The base reserve module 406 determines a base reserve based upon the stabilized RPM and the stabilized APC. The base reserve may correspond to additional torque (i.e., reserve torque) available at the current RPM and APC. For example only, the base reserve module 406 may determine the base reserve from one or more lookup tables.

Various components of the engine system 100 may be powered by the engine 102, such as the power steering system 193. Use of the power steering system 193 may therefore load (i.e., draw torque from) the engine 102. If such loads are unanticipated, the engine 102 may be unable to produce the desired torque and a decrease in RPM may be noticed.

A power steering reserve module 408 determines the power steering reserve based upon the power steering angle (PS) and the rate of change of the power steering angle (PSRate). For example only, the power steering reserve may increase as the power steering angle increases (from the predetermined angle). The power steering reserve may also increase as the rate of change of the power steering angle increases. For example only, the power steering reserve module 408 may determine the power steering reserve from one or more lookup tables.

The reserve torque module 308 includes a summation module 410 that adds the power steering reserve to the base reserve. In this manner, the reserve torque module 308 increases the reserve torque to prevent a decrease in RPM that may otherwise be noticed when the power steering system 193 is used.

The reserve torque may also be adjusted based upon various conditions, such as the oil temperature (OT) and/or the barometric pressure (BARO). The reserve torque module 308 includes a barometric pressure reserve module 412 and an oil temperature reserve module 414. The barometric pressure reserve module 412 determines a barometric pressure correction factor ($K_B$) based upon the barometric pressure. The barometric pressure reserve module 412 may determine $K_B$ from, for example, a lookup table. The oil temperature reserve module 414 determines an oil temperature correction factor ($K_T$) based upon the oil temperature. The oil temperature reserve module 414 may determine $K_T$ from, for example, a lookup table.

The reserve torque module 308 adjusts the sum of the base reserve and the power steering reserve based upon the barometric pressure correction factor and/or the oil temperature correction factor. For example only, the reserve torque may be determined by multiplying $K_B$ and $K_T$ with the sum of the base reserve and the power steering reserve. The reserve torque module 308 may include a first multiplier module 416 and a second multiplier module 418. $K_B$ and $K_T$ may be multiplied to the sum of the base reserve and the power steering reserve via the first multiplier module 416 and the second multiplier module 418, respectively. For example only, the reserve torque may be expressed by the equation:

$$\text{Reserve Torque}=(\text{Base Reserve}+\text{Power Steering Reserve})*K_T*K_B, \quad (9)$$

where the base reserve is a function of the stabilized RPM and the stabilized APC.

The reserve torque may be provided to a reserve torque limits module 420. The reserve torque limits module 420 may apply limits to the reserve torque, such as an upper limit and/or a lower limit. For example, the upper limit may be set the spark timing that achieves the maximum possible torque. The lower limit may be applied to, for example, prevent stalling the engine 102. The RPM control module 222 may then determine the RPM control desired predicted torque (Desired Predicted $\text{Torque}_{RPM}$) and the RPM control desired immediate torque (Desired Immediate $\text{Torque}_{RPM}$) based upon the reserve torque. Alternatively, these limits may be applied to the (selected) desired immediate torque by the immediate torque control module 210. The reserve torque limits module 420 may also filter the system to provide system stability. For example only, the filter may be a low-pass filter, a lag filter, or any other suitable filter.

Figure 5:
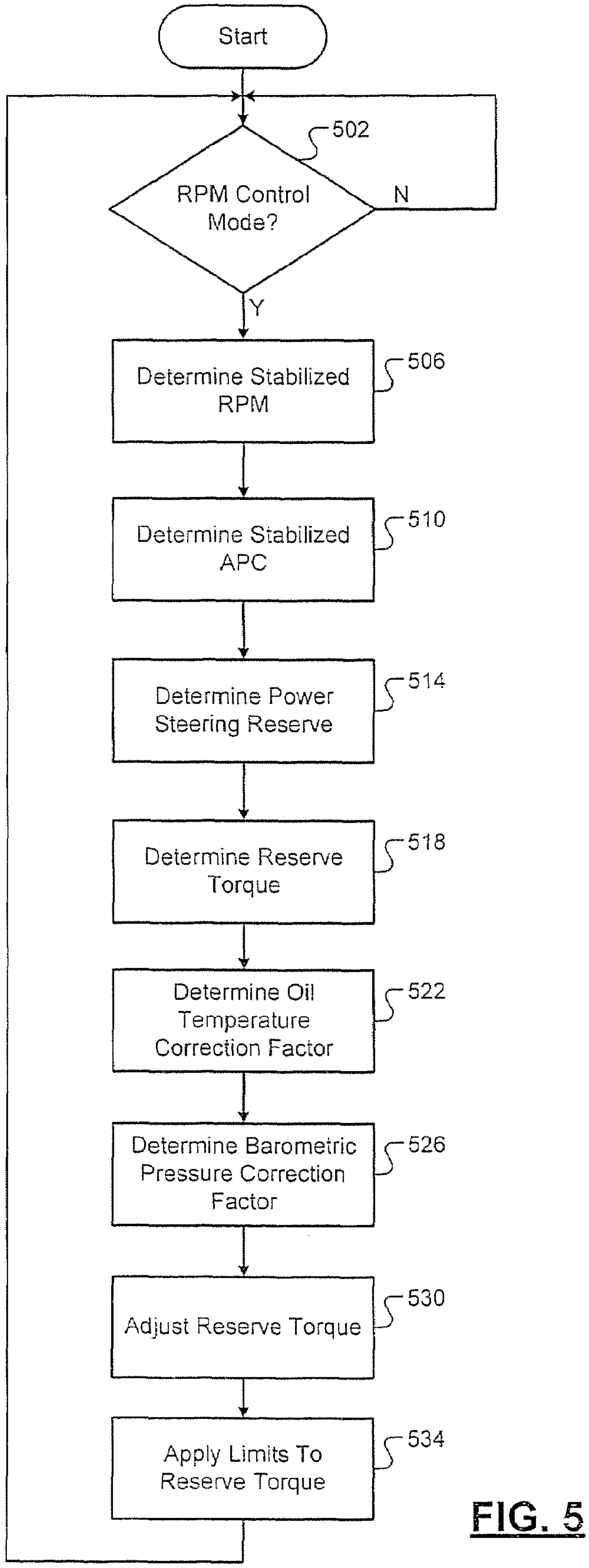
FIG. 5 is a flowchart depicting exemplary steps performed by the reserve torque module according to the principles of the present disclosure.

Referring now to FIG. 5, a flowchart depicting exemplary steps performed by the reserve torque module 308 is presented. Control begins in step 502 where control determines whether the control mode is the RPM control mode. If so, control continues in step 506; otherwise, control remains in step 502. In step 506, control determines a stabilized RPM. Control may determine the stabilized RPM based upon the RPM and the desired RPM. For example only, control may determine the stabilized RPM using equation (7) above.

Control continues in step 510, where control determines the stabilized APC. Control may determine the stabilized APC based upon the APC and the desired APC. The APC may be provided by, for example, the MAF to APC converter 310, which may determine the APC based upon the MAF signal from the MAF sensor 186. For example only, control may determine the stabilized APC using equation (8) above.

Control continues in step 514 where control determines the power steering reserve. The power steering reserve may be a function of the power steering angle (i.e., PS) and the rate of change of the power steering angle (i.e., PSRate). Control continues in step 518 where control determines the reserve torque. For example only, control may determine the reserve torque based upon the stabilized RPM, the stabilized APC, and the power steering reserve.

Control then continues in step 522 where control determines the oil temperature correction factor, $K_T$. For example, control may determine $K_T$ based upon the OT signal from the OT sensor 183 and/or a lookup table. In step 526, control determines the barometric pressure correction factor, $K_B$. For example, control may determine $K_B$ based upon the BARO signal from the barometric pressure sensor 185 and/or a lookup table. Control then continues in step 530, where control adjusts the reserve torque. In various implementations, control may adjust the reserve torque based upon $K_T$ and/or $K_B$. For example only, the reserve torque may then be expressed by equation (9), above.

In step 534, control applies limits to the reserve torque. In various implementations, control may apply an upper limit that corresponds to a calibrated spark timing that achieves the maximum possible torque. Additionally, control may apply a lower limit to, for example, prevent stalling the engine 102. Control may then adjust one or more engine actuators based upon the reserve torque.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An engine control module comprising:

a base reserve module that determines a base reserve torque;

a power steering reserve module that determines a power steering reserve torque;

a reserve torque module that determines a first reserve torque based on said base reserve torque, said power steering reserve torque, and at least one of an oil temperature of an engine and a barometric pressure;

first and second engine actuator modules that control first and second actuators of the engine, respectively; and an engine speed control module that instructs the first engine actuator module to produce a first torque output from the engine and that instructs the second engine actuator module to produce a second torque output from the engine, wherein said second torque output is approximately equal to a sum of said first reserve torque and said first torque output.

2. The engine control module of claim 1 wherein said engine speed control module, in order to produce said first torque output from the engine, instructs said first engine actuator module to produce said first torque output and said second engine actuator module to produce said second torque output.

3. The engine control module of claim 1 wherein said first engine actuator module comprises a spark control module and said second engine actuator module comprises a throttle area control module.

4. The engine control module of claim 1 wherein said base reserve module determines said base reserve torque based on air per cylinder (APC) of said engine and engine speed (RPM).

5. The engine control module of claim 4 further comprising:

a stabilized RPM module that determines a stabilized RPM based on said RPM, a desired RPM, and a predetermined RPM value; and a stabilized APC module that determines a stabilized APC based on said APC, a desired APC, and a predetermined APC value, wherein said base reserve module determines said base reserve torque based on said stabilized RPM and said stabilized APC.

6. The engine control module of claim 1 wherein said power steering reserve module determines said power steering reserve torque based on power steering angle and rate of change of said power steering angle.

7. The engine control module of claim 1 wherein said reserve torque module determines said first reserve torque based on said oil temperature and said barometric pressure.

8. The engine control module of claim 1 wherein an increase in said oil temperature results in a decrease in said first reserve torque.

9. The engine control module of claim 1 wherein an increase in said barometric pressure results in a decrease in said first reserve torque.

10. The engine control module of claim 1 further comprising a reserve torque limits module that applies at least one of an upper limit and a lower limit to said first reserve torque.

11. A method comprising:

determining a base reserve torque;

determining a power steering reserve torque;

determining a first reserve torque based on said base reserve torque, said power steering reserve torque, and at least one of an oil temperature of an engine and a barometric pressure;

adjusting a first engine actuator to produce a first torque output from the engine; and adjusting a second engine actuator to produce a second torque output from the engine, wherein said second torque output is approximately equal to a sum of said first reserve torque and said first torque output.

12. The method of claim 11 further comprising producing said first torque output from the engine by adjusting said first engine actuator to produce said first torque output and by adjusting said second engine actuator to produce said second torque output.

13. The method of claim 11 wherein said base reserve is determined based on air per cylinder (APC) of the engine and engine speed (RPM).

14. The method of claim 13 further comprising:

determining a stabilized RPM based on said RPM, a desired RPM, and a predetermined RPM value; and determining a stabilized APC based on said APC, a desired APC, and a predetermined APC value, wherein said base reserve torque is determined based on said stabilized RPM and said stabilized APC.

15. The method of claim 11 wherein said power steering reserve torque is determined based on power steering angle and rate of change of said power steering angle.

16. The method of claim 11 wherein said first reserve torque is determined based on said oil temperature and said barometric pressure.

17. The method of claim 11 wherein an increase in said oil temperature results in a decrease in said first reserve torque.

18. The method of claim 11 wherein an increase in said barometric pressure results in a decrease in said first reserve torque.

19. The method of claim 11 further comprises applying at least one of an upper limit and a lower limit to said first reserve torque.

* * * * *